United States Patent
Sullivan et al.

(10) Patent No.: US 11,065,508 B2
(45) Date of Patent: Jul. 20, 2021

(54) GOLF BALL HAVING AT LEAST ONE LAYER CONSISTING OF A MIXTURE OF A THERMOSET OR THERMOPLASTIC COMPOSITION AND A PLURALITY OF ALKOXYLATED SILOXANE-SURFACE TREATED PARTICLES AND/OR POLYETHER-MODIFIED SILOXANE-SURFACE TREATED PARTICLES

(71) Applicant: Acushnet Company, Fairhaven, MA (US)

(72) Inventors: Michael J. Sullivan, Old Lyme, CT (US); Brian Comeau, Berkley, MA (US); Michael Michalewich, Norton, MA (US)

(73) Assignee: Acushnet Company, Fairhaven, MA (US)

( * ) Notice: Subject to any disclaimer, the term of this patent is extended or adjusted under 35 U.S.C. 154(b) by 70 days.

(21) Appl. No.: 16/540,110

(22) Filed: Aug. 14, 2019

(65) Prior Publication Data
US 2020/0001140 A1 Jan. 2, 2020

Related U.S. Application Data

(62) Division of application No. 15/635,405, filed on Jun. 28, 2017, now Pat. No. 10,427,003.

(51) Int. Cl.
| | |
|---|---|
| *A63B 37/12* | (2006.01) |
| *C08K 9/06* | (2006.01) |
| *A63B 37/00* | (2006.01) |
| *C08K 9/08* | (2006.01) |
| *C08K 3/22* | (2006.01) |
| *C08K 3/30* | (2006.01) |
| *C09D 201/00* | (2006.01) |
| *C09D 175/02* | (2006.01) |
| *C09D 175/04* | (2006.01) |
| *B32B 5/18* | (2006.01) |
| *B32B 27/40* | (2006.01) |
| *C08G 18/10* | (2006.01) |
| *C08G 18/48* | (2006.01) |
| *C08L 23/08* | (2006.01) |

(52) U.S. Cl.
CPC ...... *A63B 37/0022* (2013.01); *A63B 37/0024* (2013.01); *A63B 37/0027* (2013.01); *A63B 37/0031* (2013.01); *A63B 37/0033* (2013.01); *A63B 37/0035* (2013.01); *A63B 37/0047* (2013.01); *A63B 37/0062* (2013.01); *A63B 37/0064* (2013.01); *A63B 37/0065* (2013.01); *A63B 37/0078* (2013.01); *A63B 37/0082* (2013.01); *A63B 37/0091* (2013.01); *A63B 37/0093* (2013.01); *B32B 5/18* (2013.01); *B32B 27/40* (2013.01); *C08G 18/10* (2013.01); *C08G 18/4854* (2013.01); *C08K 3/22* (2013.01); *C08K 3/30* (2013.01); *C08K 9/06* (2013.01); *C08K 9/08* (2013.01); *C08L 23/0876* (2013.01); *C09D 175/02* (2013.01); *C09D 175/04* (2013.01); *C09D 201/00* (2013.01); *A63B 37/0087* (2013.01); *B32B 2266/0278* (2013.01); *C08K 2003/2241* (2013.01); *C08K 2003/2296* (2013.01); *C08K 2003/3036* (2013.01); *C08K 2003/3045* (2013.01)

(58) Field of Classification Search
None
See application file for complete search history.

(56) References Cited

U.S. PATENT DOCUMENTS

| | | |
|---|---|---|
| 4,985,477 A | 1/1991 | Collins et al. |
| 5,204,088 A | 4/1993 | Noebel et al. |
| (Continued) | | |

FOREIGN PATENT DOCUMENTS

WO 2005019328 A1 3/2005

OTHER PUBLICATIONS

The influence of filler treatment on the mechanical properties and phase behavior of thermoplastic polyurethane/polypylene blends; Emi Goverein Bjasic, Veljko Filipan, Vesna Oclic Bulatovic and Bilko Mandie; Dec. 16, 2016; pp. 1-17.

(Continued)

*Primary Examiner* — David J Buttner
(74) *Attorney, Agent, or Firm* — Margaret C. Barker

(57) ABSTRACT

Golf ball having CoR of at least 0.700 and Atti compression of at least about 50 and comprising layer comprising a mixture of ionomer composition and a plurality of particulates, at least some being surface-treated with alkoxylated siloxanes and/or polyether-modified siloxanes, and selected from titanium dioxide particles, barium sulfate particles, zinc sulfide particles, and/or zinc oxide particulates. At least some particulates may be contacted with compound having the formula:

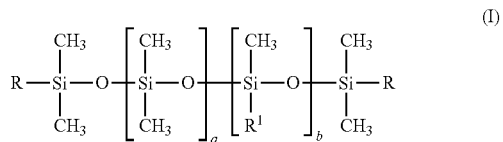

Compound (I) may be included in amount of 0.01 to 2% by weight based on total weight of portion of plurality being contacted. The plurality may be included in mixture in amount such that the layer has specific gravity of from 0.5 to about 5.0, tensile strength of from about 300 psi to about 50,000 psi, and elongation at break of from about 20% to about 1000%, each being greater than that of the ionomer composition portion of the mixture.

13 Claims, No Drawings

(56) References Cited

U.S. PATENT DOCUMENTS

| | | |
|---|---|---|
| 5,500,216 A | 3/1996 | Julian et al. |
| 5,902,192 A | 5/1999 | Kashiwagi et al. |
| 5,935,021 A | 8/1999 | Kashiwagi et al. |
| 6,120,390 A * | 9/2000 | Dalton .............. A63B 37/0003 473/351 |
| 6,228,133 B1 | 5/2001 | Thurber et al. |
| 6,290,614 B1 | 9/2001 | Kennedy |
| 7,207,904 B2 | 4/2007 | Isogawa et al. |
| 7,208,538 B2 | 4/2007 | Taylor et al. |
| 7,491,138 B2 | 2/2009 | Kennedy, III et al. |
| 7,604,553 B2 | 10/2009 | Shinohara |
| 8,487,029 B2 | 7/2013 | Wang |
| 8,772,398 B2 | 7/2014 | Strange et al. |
| 9,180,346 B2 | 11/2015 | Binette et al. |
| 9,279,073 B2 | 3/2016 | Bleecher et al. |
| 9,388,325 B2 | 7/2016 | Jones et al. |
| 2002/0034989 A1 | 3/2002 | Sullivan |
| 2004/0229995 A1 | 11/2004 | Wu |
| 2005/0277717 A1 | 12/2005 | Joshi et al. |
| 2006/0089210 A1 | 4/2006 | Sullivan |
| 2009/0025870 A1 | 1/2009 | Tanaka |
| 2010/0173117 A1 | 7/2010 | Duke |
| 2010/0266855 A1 | 10/2010 | Zubowski |
| 2012/0064999 A1 | 3/2012 | Ricci et al. |
| 2016/0346972 A1 | 12/2016 | Binette |
| 2016/0362556 A1 | 12/2016 | Lehmann et al. |
| 2017/0002181 A1 | 1/2017 | Lehmann et al. |

OTHER PUBLICATIONS

Hindawi Publishing Corporation; Effect of Nanosilica Filled Polyurethane Composite Coating on Polypropylene Substrate; Yern Chee Ching and Nureham Syamimie; pp. 1-9.

The Effect of Filler Size, Rheology Control Agent Content and Temperature Variation on Viscosity of Epoxy Resin System; F. Nihal Tuzun; pp. 52-57.

* cited by examiner

GOLF BALL HAVING AT LEAST ONE LAYER CONSISTING OF A MIXTURE OF A THERMOSET OR THERMOPLASTIC COMPOSITION AND A PLURALITY OF ALKOXYLATED SILOXANE-SURFACE TREATED PARTICLES AND/OR POLYETHER-MODIFIED SILOXANE-SURFACE TREATED PARTICLES

CROSS-REFERENCE TO RELATED APPLICATIONS

This application is a divisional of U.S. patent application Ser. No. 15/635,405, filed Oct. 22, 2018 now U.S. Pat. No. 10,427,003.

FIELD OF THE INVENTION

The present invention relates to golf balls incorporating layer compositions having excellent tensile strength and elongation at break as well as desired specific gravity.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

Ultimately, a golf ball must be able to withstand the great force and impact of a club face striking it. In this regard, tensile properties of golf ball materials such as the tensile strength and elongation are important considerations. Tensile properties indicate how the material will react to forces being applied in tension. In particular, tensile strength is a measure of the material's resistance to failure under an applied stress or load per unit area. Meanwhile, elongation measures the material's elasticity up to its breaking point under the load. That is, elongation measures the percentage (%) change in length before fracture. Such qualities are especially important in an outer golf ball layer which contacts the club face directly.

Therefore, there is a need for golf balls incorporating improved compositions which can exhibit excellent tensile strength and elongation without meanwhile sacrificing other important physical properties such as the specific gravity of a layer which is also an important property because it can effect characteristics of the golf ball such as Moment of Inertia (MOI). Such golf balls, which may meanwhile be produced cost effectively within existing manufacturing processes, would be particularly desirable and useful. The current golf balls of the invention incorporating such layers and methods for making same address and solve these needs.

SUMMARY OF THE INVENTION

Accordingly, a golf ball of the invention incorporates at least one layer comprised of a material which advantageously possesses the physical properties of excellent tensile strength and elongation and meanwhile can have a specific gravity sufficient to produce a wide range of desirable golf ball playing characteristics. In one embodiment, a golf ball of the invention has a CoR of at least 0.700 and an Atti compression of at least about 50 and comprises at least one layer consisting of a mixture of a thermoset or thermoplastic composition and a plurality of particulates, wherein at least a portion of the plurality is surface-treated with alkoxylated siloxanes, polyether-modified siloxanes, or combinations thereof. The particulates may be selected from the group consisting of titanium dioxide particles, barium sulfate particles, zinc sulfide particles, zinc oxide particulates, or combinations thereof. At least a portion of the plurality of particulates may be contacted with at least one surface-treatment compound having the formula:

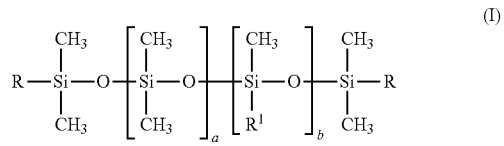

(I)

wherein: R identically or differently is $R^1$, methyl or hydroxyl; $R^1$ identically or differently is a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3; and wherein the compound of formula (I) is included in an amount of 0.01 to 2% by weight based on the total weight of the portion of the plurality of particulates being contacted.

In one embodiment, the plurality of particulates may be included in the mixture in an amount such that the layer has a specific gravity of from 0.5 to about 10.0 and greater than a specific gravity of the thermoset or thermoplastic composition. In another embodiment, the plurality of particulates may be included in the mixture in an amount such that the layer has a specific gravity of from 0.5 to less than 1.05. In yet another embodiment, the plurality of particulates may be included in the mixture in an amount such that the layer has a specific gravity of from 1.05 to 1.50. In still another embodiment, the plurality of particulates may be included in the mixture in an amount such that the layer has a specific gravity of greater than 1.50. In an alternative embodiment, the plurality of particulates is included in the mixture in an amount such that the layer has a specific gravity of from 5.0 to about 10.0.

In a particular embodiment, the plurality of particulates creates a specific gravity gradient within the layer.

In one embodiment, 100 weight percent ("wt %") of the plurality of particulates is contacted with the surface-treatment compound. In another embodiment, 50 wt % or greater of the plurality of particulates is contacted with the surface-treatment compound. In yet another embodiment, less than 50 wt % of the plurality of particulates is contacted with the surface-treatment compound.

In a different embodiment, the plurality of particulates may be included in the mixture in an amount of up to about 25 wt % of the total weight of the mixture. In a specific such embodiment, the plurality of particulates may be included in the mixture in an amount of greater than 10 wt % of the total weight of the mixture.

The mixture may have a tensile strength of from about 300 psi to about 50,000 psi and greater than a tensile strength of the thermoset or thermoplastic composition.

The mixture may also have an elongation at break of from about 20% to about 1000% and greater than greater than an elongation at break of the thermoset or thermoplastic composition.

In one embodiment, the at least one layer is a coating having a Sward rocker hardness of about 5 or greater and greater than a Sward rocker hardness of the thermoset or thermoplastic composition.

In another embodiment, the coating has a Sward rocker hardness of about 10 or greater. In yet another embodiment, the at least one layer is a coating having a Sward rocker hardness of from about 30 to 80 and greater than a Sward rocker hardness of a coating consisting of the thermoset or thermoplastic composition.

The coating may have a pencil hardness of 3 H or less and greater than a pencil hardness of a coating consisting of the thermoset or thermoplastic composition. The coating may have a pencil hardness of HB or less and greater than a pencil hardness of a coating consisting of the thermoset or thermoplastic composition. The coating may have a pencil hardness of from about 3 H to about 7 H and greater than a pencil hardness of a coating consisting of the thermoset or thermoplastic composition.

The at least one layer may be a coating, wherein the thermoset or thermoplastic composition comprises at least one of a latex, a lacquer, and an enamel. The at least one layer may be a coating, wherein the thermoset or thermoplastic composition comprises at least one of a urethane, an acrylic, an epoxy, a urethane acrylate, and an alkyd.

The at least one layer may have an MVTR that is less than an MVTR of an adjacent inner layer consisting of the thermoset or thermoplastic composition.

The thermoset or thermoplastic composition may comprises at least one of a thermoset polyurethane, a thermoplastic polyurethane, a polyurea, or an ionomer.

In one embodiment, the at least one layer may be a core layer wherein the thermoset or thermoplastic composition of the mixture is a thermoset rubber composition, wherein the layer has a surface hardness of from about 45 Shore C to about 95 Shore C and greater than a Shore C surface hardness of a layer consisting of the thermoset rubber composition.

In a particular embodiment, a golf ball of the invention may have a CoR of at least 0.700 and an Atti compression of at least about 50. The golf ball comprises a core comprising a rubber composition and having a diameter of at least 1.3 inches and a compression of from about 15 to about 60; and a cover layer having a thickness of from about 0.010 inches to about 0.045 inches and a hardness of from about 30 Shore D to about 75 Shore D and consisting of a mixture of a thermoset or thermoplastic composition, comprising at least one of a thermoset polyurethane, a thermoplastic polyurethane, a polyurea or an ionomer, and a plurality of particulates, wherein at least a portion of the plurality is surface-treated with alkoxylated siloxanes, polyether-modified siloxanes, or combinations thereof.

The particulates are selected from the group consisting of titanium dioxide particles, barium sulfate particles, zinc sulfide particles, zinc oxide particulates, or combinations thereof; and at least a portion of the plurality of particulates are contacted with at least one compound having the formula:

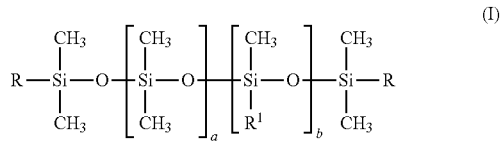

wherein: R identically or differently is $R^1$, methyl or hydroxyl; $R^1$ is identically or differently a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3.

The compound having formula (I) is included in an amount of 0.01 to 2% by weight based on the total weight of the portion of particles contacted with the surface-treatment compound; wherein the plurality of particulates is included in the mixture in an amount such that the layer has a specific gravity of from 0.5 to about 10.0 and greater than a specific gravity of the thermoset or thermoplastic composition; and wherein the Shore D hardness of the cover layer is greater than a Shore D hardness of the thermoset or thermoplastic composition.

In another particular embodiment, a golf ball of the invention has a CoR of at least 0.700 and an Atti compression of at least about 50 and comprises a core comprising a rubber composition and having a diameter of at least 0.5 inches and a surface hardness of from about 45 Shore C to about 95 Shore C; and a cover layer having a thickness of from about 0.010 inches to about 0.045 inches and a hardness of from about 30 Shore D to about 75 Shore D and consisting of a mixture of a thermoset or thermoplastic composition, comprising at least one of a thermoset polyurethane, a thermoplastic polyurethane, a polyurea or an ionomer, and a plurality of particulates, wherein at least a portion of the plurality is surface-treated with alkoxylated siloxanes, polyether-modified siloxanes, or combinations thereof.

The particulates are selected from the group consisting of titanium dioxide particles, barium sulfate particles, zinc sulfide particles, zinc oxide particulates, or combinations thereof; wherein at least a portion of the plurality of particulates are contacted with at least one compound having the formula:

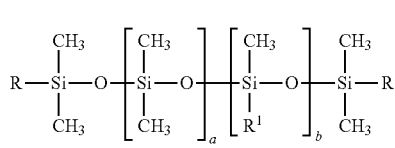

wherein: R identically or differently is $R^1$, methyl or hydroxyl; $R^1$ is identically or differently a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3.

The compound having formula (I) is included in an amount of 0.01 to 2% by weight based on the total weight of the portion of particles contacted with the surface-treatment compound; wherein the plurality of particulates is included in the mixture in an amount such that the layer has a specific gravity of from 0.5 to about 10.0 and greater than a specific gravity of the thermoset or thermoplastic composition; and wherein the Shore D hardness of the cover layer is greater than a Shore D hardness of the thermoset or thermoplastic composition.

In a specific embodiment of each of the foregoing two particular golf ball constructions, the thermoset or thermoplastic composition may comprise at least one of a polyurethane foam or a polyurea foam.

The invention also relates to a method of making a golf ball, comprising providing a subassembly and forming at least one layer about the subassembly, wherein at least one of the subassembly and outer layer consists of a mixture of a thermoset or thermoplastic composition and a plurality of particulates, wherein at least a portion of the plurality is surface-treated with alkoxylated siloxanes, polyether-modified siloxanes, or combinations thereof. The particulates may be selected from the group consisting of titanium dioxide particles, barium sulfate particles, zinc sulfide particles, zinc oxide particulates, or combinations thereof.

At least a portion of the plurality of particulates may be contacted with at least one compound having the formula:

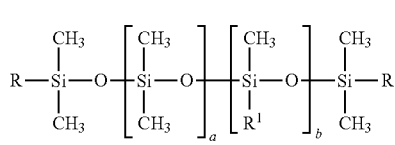

wherein: R identically or differently is $R^1$, methyl or hydroxyl; $R^1$ identically or differently is a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3; and wherein the compound of formula (I) is included in an amount of 0.01 to 2% by weight based on the total weight of the portion of the plurality of particulates being contacted.

DETAILED DESCRIPTION

A golf ball of the invention incorporates at least one layer comprised of a material which advantageously possesses excellent tensile strength and elongation and meanwhile may have a specific gravity sufficient to produce a wide range of desired playing characteristics. In one embodiment, a golf ball of the invention has a CoR of at least 0.700 and an Atti compression of at least about 50 and comprises at least one layer consisting of a mixture of a thermoset or thermoplastic composition and a plurality of particulates, wherein at least a portion of the plurality is surface-treated with alkoxylated siloxanes, polyether-modified siloxanes, or combinations thereof. The particulates may be selected from the group consisting of titanium dioxide particles, barium sulfate particles, zinc sulfide particles, zinc oxide particulates, or combinations thereof.

At least a portion of the plurality of particulates may be contacted with at least one compound having the formula:

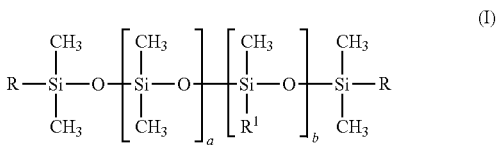

wherein: R identically or differently is $R^1$, methyl or hydroxyl; $R^1$ identically or differently is a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3; and wherein the compound of formula (I) is included in an amount of 0.01 to 2% by weight based on the total weight of the portion of the plurality of particulates being contacted. Non-limiting examples of suitable particulates for the plurality of particulates portion of the inventive mixture are set forth in U.S. Publication Nos. 2016/0362556 A1 and 2017/0002181 A1 of Lehmann et al., each hereby incorporated by reference herein in its entirety.

A layer of mixture can be produced having a specific gravity within a range suitable for producing a wide range of desirable golf ball playing characteristics. The term, "specific gravity" as used herein, has its ordinary and customary meaning, that is, the ratio of the density of a substance to the density of water at 4.degree. C., and the density of water at this temperature is 1 g/cm.sup.3. The specific gravity may be measured according to ASTM test specification ASTM D-792-98.

The specific gravity of a layer material can be adjusted and distributed throughout the golf ball to impact golf ball Moment of Inertia (MOI). MOI plays an important role in controlling the spin rate of the golf ball and ultimately, its aerodynamic properties. In general, the Moment of Inertia of a ball (or other object) about a given axis refers to how difficult it is to change the ball's angular motion about that axis. If the ball's mass is concentrated towards the center (the center piece has a higher specific gravity than the outer piece), less force is required to change its rotational rate, and the ball has a relatively low Moment of Inertia. In such balls, most of the mass is located close to the ball's axis of rotation and less force is needed to generate spin. Thus, the ball has a generally high spin rate. Conversely, if the ball's mass is concentrated towards the outer surface (the outer piece has a higher specific gravity than the center piece), more force is required to change its rotational rate, and the ball has a relatively high Moment of Inertia. That is, in such balls, most of the mass is located away from the ball's axis of rotation and more force is needed to generate spin. Such balls have a generally low spin rate.

Amateur golfers may have a difficult time controlling the ball and hitting it in a relatively straight line where the spin rate is high. Such high-spin balls tend to have a side-spin so that when a golfer hook or slices the ball, it may drift off-course. Conversely, amateur golfers may have an easier time controlling the ball and hitting it in a relatively straight line where the spin rate is low. The ball tends to travel a greater distance which is particularly important for driver shots off the tee.

As described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference).

In many embodiments, golf balls of the present invention have a moment of inertia ("MOI") of from about 70 g·cm$^2$ to about 95 g·cm$^2$, or from 70 g·cm$^2$ to 95 g·cm$^2$, or from 75 g·cm$^2$ to 93 g·cm$^2$, or from 76 g·cm$^2$ to 90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

In one embodiment, the plurality of particulates may be included in the mixture in an amount such that the layer has a specific gravity of from 0.5 to about 10.0 and greater than a specific gravity of the thermoset or thermoplastic composition. In another embodiment, the plurality of particulates may be included in the mixture in an amount such that the layer has a specific gravity of from 0.5 to less than 1.05. In yet another embodiment, the plurality of particulates may be included in the mixture in an amount such that the layer has a specific gravity of from 1.05 to 1.50. In still another embodiment, the plurality of particulates may be included in the mixture in an amount such that the layer has a specific gravity of greater than 1.50.

In an alternative embodiment, the plurality of particulates is included in the mixture in an amount such that the layer has a specific gravity of from 5.0 to about 10.0. In other embodiments, the plurality of particulates is included in the mixture in an amount such that the layer has a specific gravity of from 0.5 to about 0.95, or from 0.5 to about 1.05, or from 0.5 to about 1.25, or from 0.5 to about 1.75, or from 0.5 to about 2.5, or from 0.5 to about 4.0, or from 0.5 to about 5.0, or from 0.95 to about 3.0, or from 0.95 to about 5.0, or greater than 1.05 to less than 3.0, or from 2.5 to 8.0, or from 2.5 to 5.0, or from 2.5 to about 3.5, or from 5.0 to about 8.0, or from 5.0 to 6.5.

In a particular embodiment, the plurality of particulates creates a specific gravity gradient $\Delta_{sg}$ within the layer. The specific gravity gradient may be between at least a first region and a second region of the layer, wherein the specific gravity of the first region differs from the specific gravity of the second region. The first region and second region are adjacent within the layer and there is a contour at an interface between the first region and second region that may have any contour that is conceivable and possible to create using known golf ball manufacturing processes.

In some embodiments, the specific gravity of the first region may be greater than the specific gravity of the second region. In other embodiments, the specific gravity of the first region may be less than the specific gravity of the second region. It is envisioned that the specific gravity gradient $\Delta_{sg}$ can be as high has 9.5 and as low as 0.005. In at least some embodiments, the shape and contour of each specific gravity region within the layer can impact what upper and lower specific gravity limits are suitable for the layer.

Examples of ways that the specific gravity gradient may be created are as follows. In one embodiment, the specific gravity gradient may be created between a first region of the layer containing the plurality of particulates and a second region of the layer that does not contain the plurality of particulates. In another embodiment, the specific gravity gradient may be created between a first region of the layer containing a plurality of particulates that are surface-treated with alkoxylated siloxanes, polyether-modified siloxanes, or combinations thereof and a second region of the layer that contains a plurality of particulates that are not surface-treated with alkoxylated siloxanes, polyether-modified siloxanes, or combinations thereof. In yet another embodiment, the specific gravity gradient may be created between a first region of the layer containing a plurality of particulates that are surface treated by being contacted with the compound and a second region of the layer that contains a plurality of particulates that are surface treated by other than being contacted with the compound.

In each of these embodiments, each of the plurality of particulates of the mixture may be substantially similar, each being one of titanium dioxide particles, barium sulfate particles, zinc sulfide particles, or zinc oxide particulates. Alternatively, at least some of the particulates of the plurality may differ, with combinations of differing particulates being selected within the group of titanium dioxide particles, barium sulfate particles, zinc sulfide particles, or zinc oxide particulates in various proportions.

Meanwhile, in some embodiments, each of the plurality of particulates of the mixture may be contacted with the same compound. Additionally or alternatively, each of the plurality of particulates of the mixture may be contacted with at least one different compound.

The specific gravity gradient of the layer may coordinated with a specific gravity of at least one other layer in order to target and achieve a desired golf ball MOI.

In some embodiments, the plurality of particulates may be included in the mixture in an amount of up to about 25 wt % of the total weight of the mixture. In a specific such embodiment, the plurality of particulates may be included in the mixture in an amount greater than 10 wt % of the total weight of the mixture. That being said, the total wt. % of plurality of particulates included in the mixture may vary depending on the wt % of surface treated particulates included in the mixture as well as the wt % of surface treated particulates of the plurality that are contacted with a compound.

In one embodiment, 100 weight percent ("wt %") of the plurality of particulates of the mixture may be surface treated. In another embodiment, 50 wt % or greater of the plurality of particulates of the mixture may be surface treated. In yet another embodiment, less than 50 wt % of the plurality of particulates of the mixture may be surface treated. In still another embodiment, at least 10 wt % of the plurality of particulates of the mixture may be surface treated.

In other embodiments, 100 weight percent ("wt %") of the plurality of particulates of the mixture may be contacted with a compound. In another such embodiment, 50 wt % or greater of the plurality of particulates of the mixture may be contacted with a compound. In yet another embodiment, less than 50 wt % of the plurality of particulates of the mixture may be contacted with a compound. In still another embodiment, at least 10 wt % of the plurality of particulates of the mixture may be contacted with a compound.

In some embodiments, from 10 wt % to 100 wt % of the plurality of particulates of the mixture that are surface treated are contacted with a compound. In other embodiments, from 10 wt % to 100 wt %, or from 10 wt % to 80 wt %, or from 10 wt % to 60 wt %, or from 10 wt % to 40 wt %, or from 10 wt % to 20 wt %, or from 40 wt % to 100 wt %, or from 60 wt % to 100 wt %, or from 80 wt % to 100 wt % from 20 wt % to 80 wt %, or from 20 wt % to 60 wt %, or from 20 wt % to 40 wt %, or from 40 wt % to 80 wt %, or from 60 wt % to 80 wt %, or from 25 wt % to 75 wt %, or from 25 wt % to 50 wt %, or from 50 wt % to 75 wt % of the plurality of particulates of the mixture that are surface treated are contacted with a compound.

Advantageously, a golf ball layer containing inventive mixture meanwhile has excellent tensile properties such as tensile strength and elongation, each which is especially important in golf ball which is exposed to and must survive repeated blows by a club face on the course. As discussed above, tensile properties indicate how the material will react to forces being applied in tension, and may be measured using the appropriate ASTM for the type of material being used, including for example, ASTM D-638 or 412.

In this regard, tensile strength is a measure of the material's resistance to failure under an applied stress or load per unit area. Meanwhile, elongation measures the material's elasticity up to its breaking point under the load. That is, elongation measures the percentage (%) change in length before fracture.

The inventive mixture has a tensile strength that is greater than a tensile strength of the thermoset or thermoplastic composition. That being said, the inventive mixture may have a tensile strength of from about 300 psi to about 50,000 psi, and in specific embodiments, of from about 300 psi to about 3000 psi, or from about 300 psi to about 6,000 psi, or from about 300 psi to about 10, 000 psi, or from about 300 psi to about 20, 000 psi, or from about 300 psi to about 30,000 psi, or from about 300 psi to about 40,000 psi, or from about 3,000 to about 7,000, or from about 6,000 to about 15,000, or from about 10,000 psi to about 50,000 psi, or from about 10,000 psi to about 40,000 psi, or from about 10,000 psi to about 30,000 psi, or from about 10,000 psi to about 20,000 psi, or from about 20,000 psi to about 50,000 psi, or from about 20,000 psi to about 40,000 psi, or from about 20,000 psi to about 30,000 psi, or from about 25,000 to about 45,000, or from about 30,000 psi to about 50,000 psi, or from about 30,000 psi to about 40,000 psi, or from about 40,000 psi to about 50,000 psi.

The inventive mixture has an elongation at break that is greater than an elongation at break of the thermoset or thermoplastic composition. That being said, the inventive mixture may have an elongation at break of from about 20% to about 1000%, and in specific embodiments, of from about 20% to about 800%, or from about 20% to about 600%, or from about 20% to about 400%, or from about 20% to about 200%, or from about 20% to about 100%, or from about 20% to about 50%, or from about 20% to about 35%, or from about 50% to about 800%, or from about 50% to about 600%, or from about 50% to about 400%, or from about 50% to about 200%, or from about 50% to about 100%, or from about 100% to about 800%, or from about 100% to about 600%, or from about 100% to about 400%, or from about 100% to about 200%, or from about 100% to about 150%, or from about 200% to about 800%, or from about 200% to about 600%, or from about 200% to about 400%, or from about 200% to about 300%, or from about 200% to about 250%, or from about 300% to about 800%, or from about 300% to about 600%, or from about 300% to about 400%, or from about 300% to about 350%, or from about 400% to about 800%, or from about 400% to about 600%, or from about 400% to about 500%, or from about 400% to about 450%, or from about 500% to about 800%, or from about 500% to about 600%, or from about 500% to about 550%, or from about 600% to about 800%, or from about 600% to about 650%, or from about 700% to about 800%, or from about 700% to about 750%.

In one embodiment, the at least one layer is a coating that has a Sward rocker hardness of about 5 or greater and greater than a Sward rocker hardness of the thermoset or thermoplastic composition.

In another embodiment, the coating has a Sward rocker hardness of about 10 or greater. In yet another embodiment, the at least one layer is a coating having a Sward rocker hardness of from about 30 to 80 and greater than a Sward rocker hardness of a coating consisting of the thermoset or thermoplastic composition. In alternative embodiments, the at least one layer is a coating having Sward rocker hardness of from about 40 to 70, or from about 45 to 60, and each being greater than a Sward rocker hardness of a coating consisting of the thermoset or thermoplastic composition. Sward rocker hardness may be ascertained via ASTM D 2134.

The coating may have a pencil hardness of 3H or less and greater than a pencil hardness of a coating consisting of the thermoset or thermoplastic composition. The coating may have a pencil hardness of HB or less and greater than a pencil hardness of a coating consisting of the thermoset or thermoplastic composition. The coating may have a pencil hardness of from about 3H to about 7H and greater than a pencil hardness of a coating consisting of the thermoset or thermoplastic composition. Pencil hardness testing may be performed according to ASTM D3363.

The at least one layer may be a coating, wherein the thermoset or thermoplastic composition comprises at least one of a latex, a lacquer, and an enamel. The at least one layer may be a coating, wherein the thermoset or thermoplastic composition comprises at least one of a urethane, an acrylic, an epoxy, a urethane acrylate, and an alkyd.

The at least one layer may have an MVTR that is less than an MVTR of an adjacent inner layer consisting of the thermoset or thermoplastic composition.

The thermoset or thermoplastic composition may comprises at least one of a thermoset polyurethane, a thermoplastic polyurethane, a polyurea, or an ionomer.

In one embodiment, the at least one layer may be a core layer wherein the thermoset or thermoplastic composition of the mixture is a thermoset rubber composition, wherein the layer has a surface hardness of from about 45 Shore C to about 95 Shore C and greater than a Shore C surface hardness of a layer consisting of the thermoset rubber composition.

In a particular embodiment, a golf ball of the invention may have a CoR of at least 0.700 and an Atti compression of at least about 50. The golf ball comprises a core comprising a rubber composition and having a diameter of at least 1.3 inches and a compression of from about 15 to about 60; and a cover layer having a thickness of from about 0.010 inches to about 0.045 inches and a hardness of from about 30 Shore D to about 75 Shore D and consisting of a mixture of a thermoset or thermoplastic composition, comprising at least one of a thermoset polyurethane, a thermoplastic polyurethane, a polyurea or an ionomer, and a plurality of particulates that are surface-treated with alkoxylated siloxanes, polyether-modified siloxanes, or combinations thereof.

The particulates are selected from the group consisting of titanium dioxide particles, barium sulfate particles, zinc sulfide particles, zinc oxide particulates, or combinations thereof; and at least a portion of the plurality of particulates are contacted with at least one compound having the formula:

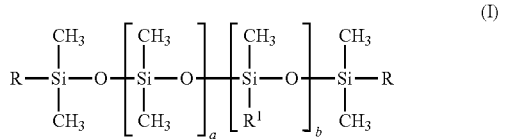

wherein: R identically or differently is $R^1$, methyl or hydroxyl; $R^1$ is identically or differently a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3.

The compound having formula (I) is included in an amount of 0.01 to 2% by weight based on the total weight of the portion of particles contacted with the compound; wherein the plurality of particulates is included in the mixture in an amount such that the layer has a specific gravity of from 0.5 to about 10.0 and greater than a specific gravity of the thermoset or thermoplastic composition; and wherein the Shore D hardness of the cover layer is greater than a Shore D hardness of the thermoset or thermoplastic composition.

In another particular embodiment, a golf ball of the invention has a CoR of at least 0.700 and an Atti compression of at least about 50 and comprises a core comprising a rubber composition and having a diameter of at least 0.5 inches and a surface hardness of from about 45 Shore C to about 95 Shore C; and a cover layer having a thickness of from about 0.010 inches to about 0.045 inches and a hardness of from about 30 Shore D to about 75 Shore D and consisting of a mixture of a thermoset or thermoplastic composition, comprising at least one of a thermoset polyurethane, a thermoplastic polyurethane, a polyurea or an ionomer, and a plurality of particulates that are surface-treated with alkoxylated siloxanes, polyether-modified siloxanes, or combinations thereof.

The particulates are selected from the group consisting of titanium dioxide particles, barium sulfate particles, zinc sulfide particles, zinc oxide particulates, or combinations thereof; wherein at least a portion of the plurality of particulates are contacted with at least one compound having the formula:

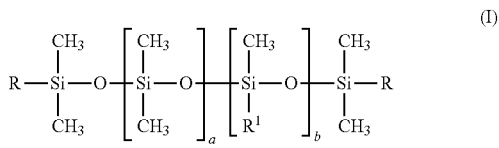

wherein: R identically or differently is $R^1$, methyl or hydroxyl; $R^1$ is identically or differently a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3.

The compound having formula (I) is included in an amount of 0.01 to 2% by weight based on the total weight of the portion of particles contacted with the compound; wherein the plurality of particulates is included in the mixture in an amount such that the layer has a specific gravity of from 0.5 to about 10.0 and greater than a specific gravity of the thermoset or thermoplastic composition; and wherein the Shore D hardness of the cover layer is greater than a Shore D hardness of the thermoset or thermoplastic composition.

In a specific embodiment of each of the foregoing two particular golf ball constructions, the thermoset or thermoplastic composition may comprise at least one of a polyurethane foam or a polyurea foam.

The invention also relates to a method of making a golf ball, comprising providing a subassembly and forming at least one layer about the subassembly, wherein at least one of the subassembly and outer layer consists of a mixture of a thermoset or thermoplastic composition and a plurality of particulates that are surface-treated with alkoxylated siloxanes, polyether-modified siloxanes, or combinations thereof. The particulates may be selected from the group consisting of titanium dioxide particles, barium sulfate particles, zinc sulfide particles, zinc oxide particulates, or combinations thereof.

At least a portion of the plurality of particulates may be contacted with at least one compound having the formula:

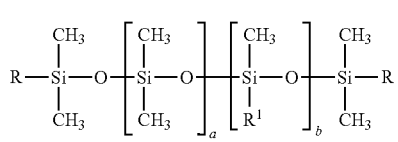

(I)

wherein: R identically or differently is $R^1$, methyl or hydroxyl; $R^1$ identically or differently is a polyether moiety of formula $-Z-(O-C_mH_{2m}-(n-1))_o-[O-(AO)-R^3]_n$; wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3; and wherein the compound of formula (I) is included in an amount of 0.01 to 2% by weight based on the total weight of the portion of the plurality of particulates being contacted.

The plurality of particulates may be mixed with the thermoset or thermoplastic composition prior to molding or otherwise being formed into a golf ball layer. The resulting layer is durable due to interactions between the plurality of particulates and thermoset or thermoplastic composition resulting in strong bonds and creating a strong polymer network having both excellent intra-layer adhesion (within the material) and cohesion.

The inventive mixture, consisting of the thermoset or thermoplastic composition and plurality of particulates, when blended together in amounts such as disclosed herein, may act synergistically to increase the thermal stability of the mixture, as compared with the thermoset or thermoplastic composition portion of the mixture singly, and impart good moldability without negatively impacting desired playing characteristics. The thermal stability of the inventive golf ball material can be measured by thermogravimetry. It is recommended that, in thermogravimetric analysis, the inventive mixture have a percent (%) weight loss at 250° C., based on the weight of the mixture at 25° C. that is less than the % weight loss of the thermoset or thermoplastic composition portion of the mixture singly.

It is contemplated that the thermoset or thermoplastic composition itself may be made using at least the ingredients disclosed herein for forming polyurethanes, polyureas, polyurethane/polyurea hybrids, polyurethane foams, polyurea foams, polyurethane/polyurea hybrid foams, ionomers, rubber-based compositions, or combinations thereof.

Thus, for example, the polyurethane polymer compositions incorporated in the inventive mixture may be formed from the reaction product of at least one polyisocyanate and at least one curing agent.

The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl) ether; trimethylol propane; and combinations thereof.

Suitable polyurethane polymer compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-2,4-toluenediamine, or an isomer thereof; 3,5-diethyltoluene-2, 4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to low free monomer MDI, low free monomer TDI, and low free monomer PPDI.

The at least one polyisocyanate may for example have about 18% or less unreacted NCO groups. In some embodiments, the at least one polyisocyanate has no greater than 8.5% NCO, more preferably from 2.5% to 8.0%, or from 3.0% to 7.2%, or from 5.0% to 6.5%.

The composition is further not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE®300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl) ether; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

In the casting process, the polyurea and polyurea/urethane compositions can be formed by chain-extending the polyurea prepolymer with a single curing agent or blend of curing agents. The resulting mixture of the present invention may be castable. While thermoplastic polyurea compositions are typically formed by reacting the isocyanate blend and polyamines at a 1:1 stoichiometric ratio, thermoset compositions, on the other hand, are cross-linked polymers and are typically produced from the reaction of the isocyanate blend and polyamines at normally a 1.05:1 stoichiometric ratio.

Suitable polyurethane polymer compositions are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyurea polymer compositions are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea materials include polyurethane/polyurea blends and copolymers comprising urethane and urea segments, as disclosed in U.S.

Patent Application Publication No. 2007/0117923, the entire disclosure of which is hereby incorporated herein by reference.

Numerous possible constructions are envisioned for a golf ball of the invention incorporating at least one layer of inventive mixture. Golf balls of the invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. Also, the USGA has established a maximum weight of 45.93 g (1.62 ounces) for golf balls. For play outside of USGA rules, the golf balls can be heavier. Thus, the diameter of the golf balls may be, for example, from about 1.680 inches to about 1.800 inches, or from about 1.680 inches to about 1.760 inches, or from about 1.680 inches (43 mm) to about 1.740 inches (44 mm), or even anywhere in the range of from 1.700 to about 1.950 inches.

The diameter and thickness of layers of golf balls of the invention, along with properties such as hardness and compression, may vary depending upon the desired playing performance properties of the golf ball such as spin, initial velocity, and feel. The term, "layer", as used herein, means generally any spherical portion of the golf ball and even includes a very thin moisture barrier film layer, although a very thin moisture barrier film layer should not negatively impact or otherwise alter golf ball playing characteristics.

Advantageously, the inventive layer of inventive mixture may be formed in a wide range of physical properties and playing characteristics and hardness, compression, resilience or CoR, modulus, tensile strength, etc. can be modified to target for example spin, distance, etc. Accordingly, the dimensions of each golf ball component such as the diameter of the core and respective thicknesses of the intermediate layer (s), cover layer(s) and/or coating layer(s) may also be selected and coordinated as known in the art for targeting and achieving such desired playing characteristics or feel.

A golf ball of the invention may for example be a two-piece golf ball, wherein a layer of inventive mixture is formed about a core. Embodiments are indeed also envisioned wherein a golf ball of the invention may have three layers, wherein one or more of the layers is a layer of inventive mixture. Of course, four layer golf balls are also envisioned, wherein at least one of the layers is a cast layer of thermoset polymer mixture. Meanwhile, embodiments are also envisioned wherein the at least one layer of inventive mixture is a spherical inner core.

Thus, a golf ball of the invention may incorporate the inventive layer of inventive mixture in any or all of an inner core, outer core layer, intermediate core layer, an intermediate layer, an inner cover layer, and/or outer cover layer. That is, golf balls of the invention may incorporate one or more layers of inventive mixture in a golf ball having any desired number of layers so long as the finished golf ball produces desired overall playing characteristic such as disclosed herein relating to golf ball CoR of at least about 0.700 and golf ball compression of at least about 50.

A golf ball of the invention incorporating at least one layer of inventive mixture is durable to withstand the great force of a club striking the golf ball without cracking or otherwise breaking due at least in part to the benefits of the layer of inventive mixture.

Golf ball layers formed of the inventive mixture of the invention may have a wide range of hardnesses, for example, a hardness of from about 20 Shore D to about 75 Shore D. In one embodiment, a layer formed of the inventive mixture of the invention may have a hardness of from about 30 Shore D to about 65 Shore D. In another embodiment, a layer formed of the inventive mixture of the invention may have a hardness of from about 40 Shore D to about 60 Shore D. In yet another embodiment, a layer formed of the inventive mixture of the invention may have a hardness of from about 50 Shore D to about 75 Shore D. Embodiments are also indeed envisioned wherein a layer formed of the inventive mixture of the invention may have a hardness of up to 80 Shore D. In some embodiments, the Shore D hardness of a layer formed of the inventive mixture of the invention may be greater than about 50. In other embodiments, a layer formed of the inventive mixture of the invention may have a Shore D hardness of about 50 or less.

Golf ball layers formed of the inventive mixture of the invention may alternatively have a hardness of from about 45 Shore C to about 95 Shore C. In one embodiment, a layer formed of the inventive mixture of the invention may have a hardness of from about 50 Shore C to about 85 Shore C. In another embodiment, a layer formed of the inventive mixture of the invention may have a hardness of from about 60 Shore C to about 90 Shore C. In yet another embodiment, a layer formed of the inventive mixture of the invention may have a hardness of from about 65 Shore C to about 85 Shore C. Embodiments are also indeed envisioned wherein a layer formed of the inventive mixture of the invention may have a hardness of up to 85 Shore C. In some embodiments, the Shore C hardness of a layer formed of the inventive mixture of the invention may be greater than about 70. In other embodiments, a layer formed of the inventive mixture of the invention may have a Shore C hardness of about 70 or less.

Meanwhile, the hardness and density of the resultant layer may be targeted by varying the isocyanate, polyol, additives, or a combination thereof. The isocyanate component of the prepolymer along with the chain extender (curing agent) are collectively designated the "hard segment" and the remaining polyol component of the prepolymer is designated the "soft segment." Thus, the hardness of polyurethanes and polyureas can be controlled by changing the ratio of "hard segment" to "soft segment." As the ratio of hard segment to soft segment increases, the hardness of the resulting polyurethane increases accordingly. Conversely, as the ratio of hard segment to soft segment decreases, the hardness of the resulting polyurethane decreases. Changing the ratio of hard segment to soft segment can be achieved by increasing or decreasing the amount of diisocyanate and/or chain extender while keeping the amount of soft segment constant. Typically, this is done by increasing/decreasing the percent of isocyanate in the prepolymer.

A similar effect on hardness may be achieved by varying the molecular weight of the soft segment. For example, using a soft segment having a lower molecular weight will generally result in a polyurethane having a higher hardness compared to a polyurethane in which a higher molecular weight soft segment was used.

Another method of changing the hardness of a polyurethane or polyurea material is by changing the crosslink density of the material. Hardness of the resultant material may be increased by increasing the crosslink density and decreased by decreasing the crosslink density. Additionally, making use of di-, tri-, and tetra-functional materials may also enable one to increase or decrease hardness as desired. Soft segment functionality has some effect on resulting hardness, however, a greater effect is obtained by changing the functionality of either the isocyanate or chain extender. Crosslink density may also be increased through the use of a dual cure system, where an unsaturated polyurethane or polyurea is reacted, followed by a free radical reaction (i.e., peroxide or UV), to create crosslinks at sites of unsaturation.

Thus, materials can be designed to have different hardness values. For example, the layer may consist of an MDI/PTMEG prepolymer at an NCO level of 8% which is chain extended with dimethylthiotoluenediamine to produce a polyurethane having a hardness of 64 Shore D. Similarly, the outer cover layer may also be based on an MDI/PTMEG prepolymer at an NCO level of 6% which is chain extended with dimethylthiotoluenediamine resulting in a cover layer that has a hardness of 45 Shore D, significantly softer than the intermediate layer. Alternatively, 6.5% NCO could result in a hardness of 48 Shore D, 9.0% NCO being 65.5 Shore D; and 10.0% NCO being 66.5 Shore D.

The thermoset or thermoplastic composition portion of the inventive mixture may additionally or alternatively include any polymer composition disclosed herein as suitable for cores, intermediate layers, covers and/or coatings.

In this regard, cores in a golf ball of the invention may for example be solid, semi-solid, fluid-filled, or hollow, and may have a single-piece or multi-piece structure. The overall diameter of the core and all intermediate layers is often about 80 percent to about 98 percent of the overall diameter of the finished ball. A variety of materials may be used to make the core including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers.

In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

More particularly, materials for solid cores typically include compositions having a base rubber, a filler, an initiator agent, and a cross-linking agent. The base rubber typically includes natural or synthetic rubber, such as polybutadiene rubber. In one embodiment, the base rubber is 1,4-polybutadiene having a cis-structure of at least 40%. The polybutadiene can be blended with other elastomers such as natural rubber, polyisoprene rubber, styrene-butadiene rubber and/or other polybutadienes. Another suitable rubber that may be used in the core is trans-polybutadiene. This polybutadiene isomer is formed by converting the cis-isomer of the polybutadiene to the trans-isomer during a molding cycle. A soft and fast agent such as pentachlorothiophenol (PCTP) or ZnPCTP can be blended with the polybutadiene. These compounds may also function as cis-to-trans catalyst to convert some cis-1, 4 bonds in the polybutadiene into trans 1, 4 bonds.

Fillers, which may be used to modify such properties as the specific gravity (density-modifying materials), hardness, weight, modulus, resiliency, compression, and the like may be added to the core composition as well as to other layer compositions of golf balls of the invention). Suitable fillers include for example clays, silicas, precipitated hydrated silica, talc, glass fibers, aramid fibers, micas, calcium meta-silicate, calcium silicate, zinc sulfate, barium sulfate, zinc sulfide, lithopone, silicates, silicon carbide, tungsten carbides, carbon black, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, cerium oxide, magnesium oxide, and zirconium oxide), nanofillers, various foaming agents or blowing agents, regrind (recycled core material typically ground to about 30 mesh or less particle size), high-Mooney-viscosity rubber regrind and the like, polymeric, ceramic, metal, and glass microspheres, and combinations thereof.

The core may for example have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches. In one embodiment, the inner core consists of a single layer formed from a thermoset rubber composition. In another embodiment, the inner core consists of two layers, each of which is formed from the same or different thermoset rubber compositions. In another embodiment, the inner core comprises three or more layers, each of which is formed from the same or different thermoset rubber compositions. In another embodiment, the inner core consists of a single layer formed from a thermoplastic composition. In another embodiment, the inner core consists of two layers, each of which is formed from the same or different thermoplastic compositions. In another embodiment, the inner core comprises three or more layers, each of which is formed from the same or different thermoplastic compositions. In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

In one embodiment, the outer core consists of a single layer formed from a thermoset rubber composition. In another embodiment, the outer core consists of two layers, each of which is formed from the same or different thermoset rubber compositions. In another embodiment, the outer core comprises three or more layers, each of which is formed from the same or different thermoset rubber compositions. In another embodiment, the outer core consists of a single layer formed from a thermoplastic composition. In another embodiment, the outer core consists of two layers, each of which is formed from the same or different thermoplastic compositions. In another embodiment, the outer core comprises three or more layers, each of which is formed from the same or different thermoplastic compositions.

An intermediate core layer can have an overall thickness within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches. In one embodiment, the intermediate core consists of a single layer formed from a thermoset rubber composition. In another embodiment, the intermediate core consists of two layers, each of which is formed from the same or different thermoset rubber compositions. In another embodiment, the intermediate core comprises three or more layers, each of which is formed from the same or different thermoset rubber compositions. In another embodiment, the intermediate core consists of a single layer formed from a thermoplastic composition. In another embodiment, the intermediate core consists of two layers, each of which is formed from the same or different thermoplastic compositions. In another embodiment, the intermediate core comprises three or more layers, each of which is formed from the same or different thermoplastic compositions.

The cores and core layers of golf balls of the invention may have varying hardnesses depending on the particular golf ball construction and playing characteristics being targeted. Core center and/or layer hardness can range, for example, from 35 Shore C to about 95 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 70 Shore D, or from about 30 Shore D to about 60 Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 15. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches. In this embodiment, the core may consist of a conventional core material such as a rubber composition. In some embodiments, the intermediate layer may be covered by a conventional castable thermoset or injection moldable thermoplastic material or of any other cover materials discussed herein or as is otherwise known in the art.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

In one embodiment, the cover may be a single layer having a surface hardness of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from an ionomeric composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a thermoplastic composition selected from ionomer-, polyurethane-, and polyurea-based compositions having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a thermosetting polyurethane- or polyurea-based composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer formed from an ionomeric composition and an outer cover layer formed from a thermosetting polyurethane- or polyurea-based composition. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In another embodiment, the cover may comprise an inner cover layer formed from an ionomeric composition and an outer cover layer formed from a thermoplastic composition selected from ionomer-, polyurethane-, and polyurea-based compositions. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer formed from an ionomeric composition and an outer cover layer formed from a polyurethane- or polyurea-based composition. The ionomeric layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may be formed from a castable or reaction injection moldable polyurethane, polyurea, or copolymer or hybrid of polyurethane/polyurea. Such cover material may be thermosetting, but may be thermoplastic in other embodiments. The outer cover layer composition may have a material hardness of 85 Shore C or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

It is envisioned that golf balls of the invention may also incorporate conventional coating layer(s) for the purposes usually incorporated. For example, one or more coating layer may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

Golf balls of the invention may also include cover layers made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof.

In one particular embodiment, ionomer resins can be used as the cover material. These cross-linked polymers contain inter-chain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn® (DuPont) and Escor® and Iotek® (Exxon). These ionomer resins are available in various grades and are identified based on the type of base resin, molecular weight, type of metal ion, amount of acid, degree of neutralization, additives, and other properties.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from Exxon Mobil Chemical Company. Some suitable examples of highly neutralized ionomers (HNP) are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

Any or each of core layers, intermediate/casing layers, and cover layers may be formed from ionomeric materials including blends of ionomers such as blends of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, may comprise for example ionomeric copolymers and terpolymers, ionomer precursors, thermoplastics, polyamides, polycarbonates, polyesters, polyurethanes, polyureas, polyurethane/urea hybrids, thermoplastic elastomers, polybutadiene rubber, balata, metallocene-catalyzed polymers (grafted and non-grafted), single-site polymers, high-crystalline acid polymers, cationic ionomers, and the like. HNP's typically have a material hardness of between about 20 and about 80 Shore D, and a flexural modulus of between about 3,000 psi and about 200,000 psi.

Additional suitable materials for golf ball layers include conventional polyurethanes; conventional polyureas; conventional copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

Examples of yet other materials which may be suitable for incorporating and coordinating in order to target and achieve desired playing characteristics or feel include plasticized thermoplastics, polyalkenamer compositions, polyester-based thermoplastic elastomers containing plasticizers, transparent or plasticized polyamides, thiolene compositions, polyamide and anhydride-modified polyolefins, organic acid-modified polymers, and the like.

It is envisioned that layers a golf ball of the invention may be incorporated via any of casting, compression molding, injection molding, or thermoforming. Thermoset materials are typically formed into golf ball layers by conventional reaction injection molding and compression molding techniques as well as casting, whereas thermoplastic materials are generally formed into golf ball layers by conventional compression or injection molding techniques.

A compression molding mold typically has a mold cavity formed in a pair of hemispherical molds, into which the subassembly may be placed. A combination of heat and pressure is then applied, and results in the half shells being fused to the outer surface of the subassembly as a unitary one-piece layer about the subassembly.

When injection molding is used to form a golf ball layer, the layer composition is typically in a pelletized or granulated form that can be easily fed into the throat of an injection molding machine wherein it is melted and conveyed via a screw in a heated barrel at temperatures of from about 150° F. to about 600° F., preferably from about 200° F. to about 500° F. The molten composition is ultimately injected into a closed mold cavity, which may be cooled, at ambient or at an elevated temperature, but typically the mold is cooled to a temperature of from about 50° F. to about 70° F. After residing in the closed mold for a time of from 1 second to 300 seconds, preferably from 20 seconds to 120 seconds, the core and/or core plus one or more additional core or other layers is removed from the mold and either allowed to cool at ambient or reduced temperatures or is placed in a cooling fluid such as water, ice water, dry ice in a solvent, or the like.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or CoR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. CoR is then calculated as the ratio of the outgoing transit time period to the incoming transit time period, $CoR=V_{out}/V_{in}=T_{in}/T_{out}$. The CoR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Thermoset and thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention, incorporating at least one layer od inventive mixture, as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball having a CoR of at least 0.700 and an Atti compression of at least about 50 and comprising at least one layer comprising a mixture of an ionomer composition and a plurality of particulates, wherein at least a portion of the plurality is surface-treated with alkoxylated siloxanes, polyether-modified siloxanes, or combinations thereof;

wherein the particulates are selected from the group consisting of titanium dioxide particles, barium sulfate particles, zinc sulfide particles, zinc oxide particulates, or combinations thereof;

wherein the plurality of particulates is included in the mixture in an amount such that the at least one layer has a specific gravity of from 0.5 to about 5.0 and greater than a specific gravity of the ionomer composition; and wherein the plurality of particulates creates a specific gravity gradient within the least one layer; and wherein the at least one layer is an intermediate layer and/or a cover layer.

2. The golf ball of claim 1, wherein the plurality of particulates is included in the mixture in an amount of up to about 25 wt % of the total weight of the mixture.

3. The golf ball of claim 1, wherein the plurality of particulates is included in the mixture in an amount of greater than 10 wt % of the total weight of the mixture.

4. The golf ball of claim 1, wherein the mixture has a tensile strength of from about 300 psi to about 50,000 psi and greater than a tensile strength of the ionomer composition.

5. The golf ball of claim 4, wherein the mixture has an elongation at break of from about 20% to about 1000% and greater than an elongation at break of the ionomer composition.

6. The golf ball of claim 1, wherein the at least one layer has an MVTR that is less than an MVTR of an adjacent inner layer consisting of the ionomer composition.

7. The golf ball of claim 1, wherein the layer has a thickness of from about 0.010 inches to about 0.045 inches and a hardness of from about 30 Shore D to about 75 Shore D and surrounds a core comprising a rubber composition and having a diameter of at least 1.3 inches and compression of from about 15 to about 60.

8. The golf ball of claim 1, wherein the layer has a thickness of from about 0.010 inches to about 0.045 inches and a hardness of from about 30 Shore D to about 75 Shore D and surrounds a core comprising a rubber composition and having a diameter of at least 0.5 inches and a surface hardness of from about 45 Shore C to about 95 Shore C.

9. The golf ball of claim 1, wherein the ionomer composition is foamed.

10. The golf ball of claim 1, wherein at least a portion of the plurality of particulates are contacted with at least one compound having the formula:

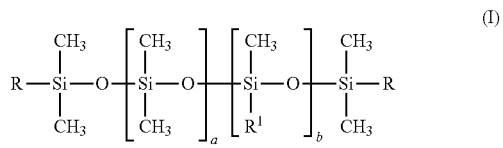

wherein: R identically or differently is $R^1$, methyl or hydroxyl; $R^1$ is identically or differently a polyether moiety of formula $-Z-(O-C_mH_{2m}-(n-1))_o-[O-(AO)-R^3]_n$;

wherein: Z is a branched alkylene moiety or an unbranched alkylene moiety having from 2 to 4 carbon atoms; m is from 2 to 4; n is from 1 to 3; o is 0 or 1; AO identically or differently is an oxyalkylene moiety comprising an oxyethylene moiety, an oxypropylene moiety, and/or an oxybutylene moiety moieties; $R^3$ identically or differently is hydrogen or an alkyl moiety having from 1 to 4 carbon atoms; and in $R^1$ a total number of carbon atoms and oxygen atoms is at least 70; a is from 20 to 200; and b is from 1 to 50; and wherein if none of moieties R is $R^1$, then b is at least 3; and wherein the compound of the formula (I) is included in an amount of 0.01 to 2% by weight based on the total weight of the portion of particles contacted with the compound.

11. The golf ball of claim 10, wherein 100 wt % of the plurality of particulates is contacted with the compound.

12. The golf ball of claim 10, wherein 50 wt % or greater of the plurality of particulates is contacted with the compound.

13. The golf ball of claim 10, wherein less than 50 wt % of the plurality of particulates is contacted with the compound.

* * * * *